United States Patent
Plumat

[15] 3,652,244
[45] Mar. 28, 1972

[54] CHEMICAL TREATMENTS FOR MODIFYING PHYSICAL PROPERTIES OF VARIOUS MATERIALS

[72] Inventor: Emile Plumat, Gilly, Belgium

[73] Assignee: Glaverbel S.A., Watermael Boitsfort, Belgium

[22] Filed: Apr. 25, 1968

[21] Appl. No.: 723,981

[30] Foreign Application Priority Data

Apr. 27, 1967 Luxembourg..............................53547
Feb. 27, 1968 Great Britain........................9,493/68

[52] U.S. Cl........................................65/30, 65/60, 65/156, 65/169, 117/124 B
[51] Int. Cl.....................................C03c 15/00, C03c 17/00
[58] Field of Search ..............................65/30, 60, 156, 169; 117/124 B

[56] References Cited

UNITED STATES PATENTS

| | | | |
|---|---|---|---|
| 1,693,735 | 12/1928 | Warga | 65/60 |
| 1,952,454 | 3/1934 | Nash | 65/60 |
| 2,825,634 | 3/1958 | Rindone | 65/30 |
| 2,927,042 | 3/1960 | Hall et al. | 65/30 |
| 3,174,919 | 3/1965 | Spremulli | 65/30 |
| 3,445,316 | 5/1969 | Megles | 65/30 |
| 3,467,508 | 9/1969 | Loukes et al. | 65/30 |
| 3,505,049 | 4/1970 | Plumat | 65/30 |
| 3,287,200 | 11/1966 | Hess et al. | 65/30 X |
| 3,396,075 | 8/1968 | Morris | 65/30 X |

*Primary Examiner*—Frank W. Miga
*Attorney*—Spencer & Kaye

[57] ABSTRACT

Method and apparatus for chemically treating glass, e.g., chemical tempering, wherein different areas of the glass are subjected to different treatment. For example, certain areas may be subjected to a stronger treatment than others to provide different areas of the glass with different characteristics.

6 Claims, 15 Drawing Figures

INVENTOR
Emile Plumat

INVENTOR
Emile Plumat

BY Spencer & Kaye
ATTORNEY

CHEMICAL TREATMENTS FOR MODIFYING PHYSICAL PROPERTIES OF VARIOUS MATERIALS

BACKGROUND OF THE INVENTION

The present invention relates to processes for modifying properties of glass, vitrocrystalline material, ceramics and rocks.

A principal technological application of the invention is in the production of tempered glass products, e.g., vehicle windshields. It is well known, that bodies with very high mechanical strength may be obtained by chemical tempering.

Such bodies have a further advantage in that they may be produced very thin, which reduces the weight of the object and enhances its flexibility. However, when these reinforced objects do break they break into relatively large pieces with very sharp edges.

SUMMARY OF THE INVENTION

With this in mind, it is a main object of the present invention to at least partially reduce these disadvantages.

Another object of the invention is to provide for the manufacture of glass which has different breaking characteristics in different portions thereof.

A further object of the invention is to provide a process for differentially chemically tempering different portions of the glass.

Still another object is to provide a process for tempering glass in such manner that even when the glass is broken it will not completely lose its transparency.

These objects and others ancillary thereto are accomplished in accordance with preferred embodiments of the invention wherein a body of glass, vitrocrystalline material, ceramic material, or rock, is modified by causing ions to diffuse into a least one surface of the body from a contacting medium at a rate which differs from one zone to another over the area of the interface between the body and medium so that the body is affected differentially, substantially according to a predetermined pattern, over such area.

As will be explained below, it appears that by applying this procedure, should the body break it tends to break into pieces of desired dimensions, preferably into small noncutting pieces. It thus becomes possible in the case of breakage of a windshield, to create "portholes" of good transparency in the midst of zones that are broken up into small noncutting pieces. This may perhaps be related to the slowly varying depth of penetration of the ions and their concentration from one zone to the neighboring one.

GENERAL DESCRIPTION OF THE INVENTION

It is known that glass can be tempered chemically. Basically the known chemical tempering of glass involves the introduction of ions into exterior layers of the glass from a contacting medium, in exchange for other ions, under suitable conditions. Thus, it is possible to set up compressive stresses by exchanging for ions in exterior layers of the glass, smaller ions which impart a lower coefficient of thermal expansion on such exterior layers while the surfaces of the glass are at a temperature above the strain point corresponding to $10^{14.6}$ poises. Alternatively, such stresses can be set up by exchanging for ions in exterior layers of the glass, larger ions while the surfaces of the glass are at a temperature below the annealing point ($10^{13.2}$ poises). It has been found according to the present invention, that glass can be differentially tempered by a chemical tempering process of either of the foregoing types. The discovery on which the invention is based also has other uses, as will be described below and can be applied to the treatment not only of glass, but also of vitrocrystalline materials (of whatever degree of crystallization), and rocks, e.g., marble.

The scope of the invention includes not only chemical tempering processes in which ions diffuse into the body undergoing treatment, in exchange for other ions, but processes in which ions are introduced into the body under the influence of an electric field without displacement of ions from the body. Moreover, by way of modification, the invention also includes processes as above defined but wherein atoms or molecules, but not ions, are caused to diffuse into the body undergoing treatment. By performing the diffusion patternwise, interesting decorative effects can be produced. For example, the color of a glass body can be modified by causing appropriate molecules, atoms, or ions to diffuse into the glass from a contacting medium in accordance with the present invention. If a particular decorative effect is desired, it is not necessary for the diffusion to occur predominantly along lines or zones subdividing the area of the material into relatively small pieces, as is desirable where the object is to encourage spontaneous division of the material into small pieces on breakage. From the foregoing it will be clear that the invention, while particularly concerned with processes of strengthening bodies of glass and other materials, is not exclusively concerned with such processes and includes processes in which the glass body is modified with respect to some other physical property and/or with respect to some chemical property.

The invention has particular advantage when used in tempering glass in sheet form, e.g., sheets of glass for windshields or other windows. If a sheet is chemically tempered according to the invention predominantly along intersecting series of lines subdividing its area, rupturing stresses tend to propagate along the network of lines, and if the network pattern is appropriately chosen as will hereafter be exemplified, the sheet will not completely lose its transparency. It is to be noted that chemical tempering processes can be performed on sheets well below the minimum thickness permissible in the case of thermal tempering and this is a further advantage of the invention.

The invention can be applied with particular advantage in the treatment of glasses of ordinary composition, i.e., glasses formed from easily available inexpensive constituents, e.g., silica, soda, lime and feldspar. Preference is also given to processes in which chemical tempering of such glasses takes place as a result of an exchange of alkali metal ions.

The diffusion of molecules, atoms, or ions into the material being treated may take place from a body of liquid medium held in a container and in which the material is immersed, from a medium forming a coating over the surface area or areas where diffusion is to occur, or from a gaseous medium. In each case the material under treatment and the medium must be brought to a suitable temperature to permit the diffusion to take place. Various different methods will now be described for achieving a predetermined patternwise treatment of the material and it will be assumed for the purpose of this description that the material being treated is in the form of a sheet.

Preferred processes according to the invention are processes wherein diffusion takes place from a medium which is applied as a coating on the sheet. Depending on the required pattern of diffusion, a medium of uniform composition can be applied differentially, i.e., to form a coating of variable thickness, according to a predetermined pattern, over at least one surface of the sheet, e.g., by a printing roller or plate or other transfer device, or, if the medium is of pastelike consistency, a uniform coating of the medium can be applied to the sheet and an impress pattern can then be formed on the coating, e.g., a screen pattern wherein the coating is of reduced thickness along the intersecting lines. The composition of the medium itself can be uniform. Alternatively, a layer of medium of varying thickness can be held against the sheet surface by a suitable mold. Variations in the thickness of the coating must however be taken into account in the heating and cooling of the coated sheet so that the desired differential effect is achieved. A differential treatment can be achieved without this complication by forming a coating of the medium which is of uniform thickness but wherein, at the treatment temperature, the concentration of the molecules, atoms, or ions available for entering the sheet varies in accordance with the predetermined pattern. It is possible, for example, to cover the or with two ro more different pastes, distributed on the sheet according to a predetermined pattern and having different concentrations of a substance or substances to be introduced into the sheet. For example, parallel bands on the sheet may be covered with two pastes applied alternately to the bands. The different pastes may provide ions of different substances for entering the sheet. Thus, one paste may provide potassium ions and the other may provide sodium ions. As another example, it is possible first to apply a coating of uniform thickness and composition to the sheet, as, e.g., by dipping the sheet in a bath of molten salt, and then to add to a certain part or parts of the coating layer (according to a predetermined distribution pattern) a substance which prior to or during the chemical tempering process provides additional amounts of the ions to be introduced into the sheet, or reduces the quantity of such ions available in that part or those parts of the layer, e.g., by forming complexes with such ions. Thus, a uniform layer of sand uniformly wetted with an aqueous solution of potassium nitrate can be supplied selectively according to a predetermined pattern with more potassium nitrate solution or a substance which forms a complex with potassium ions. As further examples, a uniform layer with a uniform concentration of potassium salt can be coated over, selectively or differentially according to a predetermined pattern, with a layer providing sodium ions the effect of which is to lower the rate of diffusion of potassium ions into the coated glass at any given zone to an extent which depends on the concentration of added sodium ions at that zone. The concentration of potassium ions at any given zone of a uniform layer can be depleted by applying to the uniform coating of potassium salt, at that zone, a pasty or aqueous medium comprising a sodium salt so that an ion exchange occurs between the two coatings.

The deposit of any given substance according to a predetermined pattern, on an already formed layer, can be achieved by supplying the additional substance to the layer through a screen or stencil with a pattern of perforations corresponding with the required differential tempering pattern, or by contacting the already formed layer with a grid or screen charged with the additional substance. The various techniques which have been described are applicable not only when causing potassium ions to diffuse into glass in exchange for sodium ions, but also when performing other ion exchange reactions.

Another manner of achieving a predetermined patternwise diffusion from a coating is first to coat the sheet surface patternwise, selectively or differentially, with a diffusion-restricting substance or substances, e.g., an aliphatic compound, such as gasoline or another aliphatic oil, or with a diffusion-promoting substance or substances, and then to apply the medium over the whole surface area. Diffusion-promoting substances can achieve their effect by weakening the diffusion barrier at the interface between the coating and the sheet. Thus, when using a medium providing lithium ions for diffusion into a glass sheet in exchange for sodium ions, the sheet may be precoated selectively or differentially with MgFe(CN)$_4$ which reduces or prevents inhibition of the diffusion due to accumulation of sodium ions in the medium, by forming a complex which is probably [FeNa(CN)$_5$]. Still another embodiment is to deliver the medium to the sheet surface after selectively or differentially coating this surface, according to the predetermined required diffusion pattern, with a substance with restricts deposition of the medium where such substance is present. In that case also, the medium may be delivered nondifferentially to the whole surface and the medium can be of uniform composition.

In processes in which the diffusion takes place from a body of liquid medium in which the sheet to be treated is immersed, or in which the diffusion takes place from a gaseous medium, patternwise diffusion can be achieved by patternwise precoating the sheet with a substance which somewhat restricts or promotes the diffusion. In the specific case of processes wherein diffusion takes place from a bath of liquid medium, the sheet being treated can, e.g., be disposed vertically with one or each face at a slight spacing from a vertical wall so that an upward or downward current will arise in the intervening layer of liquid as the diffusion of ions proceeds. If ions in the medium become replaced by heavier ions from the sheet, then such currents will be descending currents whereas if the ions from the sheet are lighter in weight, the currents will be ascending currents. By virtue of the presence of the wall or walls, such currents are steady currents undisturbed by incidental lateral currents at various levels of the bath so that the effects of the diffusion can be well controlled. Due to the ascending or descending motion of the layers of liquid from which the diffusion of ions takes place, the concentration in these liquid layers of the ions being donated will vary along the layers in the direction of the current so that there is a gradient in the effect of the treatment along the surface of the sheet. Such a gradient can be predetermined, and for certain articles can be very useful in the subsequent use of the article.

Another manner of performing the invention in a diffusion bath is to locate the surfaces of the sheet in the bath in contact with a liquid sheltering wall or screen which makes contact with such surfaces at only certain positions. The sheet surfaces are then exposed to the diffusion phenomenon selectively or differentially. A differential action occurs for example when using a perforated sheltering wall in contact with the sheet surfaces during its treatment because the diffusion will be greater at the perforations than elsewhere. A predetermined, but nonuniform, distribution of the liquid medium in contact with a sheet surface can be also achieved by using imperforate contacting walls of suitable shape, e.g., a corrugated wall or wall shaped to define with the sheet surface a distribution of pockets holding quanta of the liquid medium. The extend of diffusion which takes place at the zones of the pockets depends inter alia on their depth. The shallower they are the more quickly will the quanta of liquid in the pockets become impoverished with respect to the ions which are to diffuse into the sheet.

Diffusion from a coating on the sheet and from a bath of liquid medium or a gaseous medium may proceed simultaneously. Thus, the sheet can be coated with a suitable medium and the diffusion can be caused to proceed while the coated sheet is immersed in a bath of liquid medium which also provides ions for diffusion into the sheet. When such a procedure is adopted, the required differential effect can be achieved by forming a coating of varying thickness and/or composition or by forming a coating of uniform thickness and composition and allowing the liquid of the bath to take effect only at certain places, as for example by interposing a perforated screen between the coating and the liquid, so that the diffusion is more pronounced at the corresponding places of the sheet than at other places.

All or most of the various ways above described for achieving a predetermined patternwise treatment of a sheet are equally applicable in the treatment of material in other physical forms, e.g., hollow-ware and pressed glass articles.

The principal intended field of application of the invention is the treatment of glass in sheet form to modify its breakage characteristics so that the treated glass, if broken, spontaneously divides into pieces of a predetermined dimension or of predetermined dimensions. For this purpose the chemical tempering preferably takes place wholly or predominantly along a network of lines subdividing the area of the sheet into relatively small areas. These areas can advantageously be of various sizes. When the network of tempered lines defines a multiplicity of intermixed large and small areas, rupturing stresses tend to propagate along the outlines of the large areas first.

It is known that the diffusion of ions into a body of glass can be promoted by superimposing an electric field across the interface between the glass and the contacting medium providing the ions which diffuse into the glass. In performing an ion exchange according to the invention an electric field may be established to promote the required diffusion. The field may be established between electrodes between which the material under treatment is located. Such electrodes may, e.g., be constituted by walls of a mold or other container holding layers of the medium in contact with the material undergoing treatment.

The invention includes apparatus for use in carrying out a process as hereinbefore defined. Such apparatus comprises a mold having walls spaced apart to accommodate a body of glass or other material and layers of pasty medium on opposite sides of such body. The mold walls are shaped and disposed so that the distance between their facing surfaces varies from one position to another over the area of such faces. Means are provided for heating the mold and contents thereof to a temperature at which molecules, atoms, or ions can diffuse into the body from a contacting medium of suitable composition. The mold walls may be electrically insulated from each other and connected to a source of E.M.F. for generating an electric field between the walls.

DETAILED DESCRIPTION OF THE PREFERRED EMBODIMENTS

Figure 1:
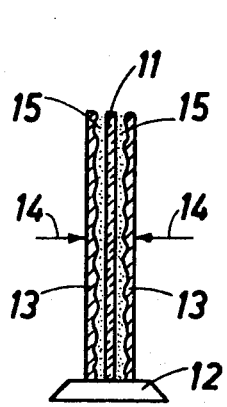
FIG. 1 is a sectional view through apparatus for performing a process according to the invention.

In the process illustrated by FIG. 1 a sheet of glass 11 to be treated, e.g., a sheet of ordinary soda-lime or borosilicate glass, is placed on a support 12 between two plates 13 with grooved inner faces. The spaces between the glass sheet and the plates 13 are filled with a medium 15 comprising a substance which provides the ions, e.g., potassium ions, which are to diffuse into the glass.

The medium may incorporate a filler, e.g., kaolin, in addition to the ionizing substance. The proportion of the filler determines the amount of ions available for diffusing into the glass. The medium may also contain an ion exchange material, which may be vitreous or nonvitreous, e.g., a finely divided potassium glass or montmorillonite which has previously been enriched with potassium ions. Such exchange materials take up ions diffusing into the medium from the glass and release further ions for diffusing into the glass. Pressure is applied to the plates 13 as indicated by the arrows 14, to shape the medium into layers of variable thickness due to the grooving of the inner surfaces of the plates. The assembly shown in FIG. 1 is placed in a furnace in which the temperature is sufficient for the required ion exchange between the layers of medium and the glass sheet to occur. Assuming that the medium contains potassium ions which are to diffuse into the glass in exchange for sodium ions, the temperature is kept below the annealing point of the glass so that compressive stresses are set up in the external layers of glass on cooling. Due to the variation in thickness of each layer of medium, the concentration of ions available for diffusing into the glass varies from one position to another along the layer and the variation in concentration is according to a predetermined pattern because it is attributable to the cross-sectional shape of the layer imparted by the plates 13. As a result, the glass sheet is differentially chemically tempered according to the predetermined pattern. The compressive stresses set up in the external layers of the glass are greatest at the regions corresponding to the maximum thickness zones of the layers of the medium. When the tempered glass sheet breaks, it spontaneously divides into smaller pieces than a uniformly tempered sheet.

If the composition of the medium is such that the shaped layers of medium adhere to the glass sheet and retain their shape when the plates 13 are removed, these plates can be removed before the treatment in the furnace. For example the potassium salt can be melted in the spaces between the plates and the glass sheet to form adherent films on the glass or to form a paste containing the salt and a filler. Alternatively, the medium may be initially applied as a paste, e.g., a paste containing a potassium salt in the form of grains or in suspension in a liquid, e.g., an alcohol or dissolved in water, with or without a filler in powder form. In that case the plates 13 can be used merely for shaping the layers of paste after they have been applied to the glass.

The procedure described with reference to FIG. 1 is also applicable when performing a chemical tempering process using a medium providing lithium ions for diffusing into the glass in exchange for sodium ions, at temperatures above the strain point of the glass.

Figure 1A:
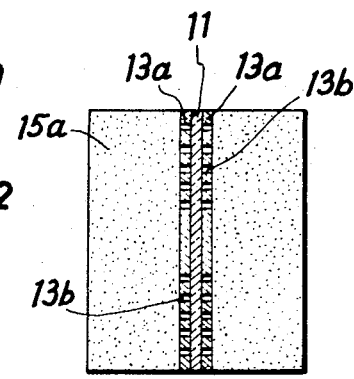
FIG. 1a is a sectional view through other apparatus for performing the process.

According to a modification of the process described with reference to FIG. 1, and as shown in FIG. 1a, plates 13a are disposed abreast of the glass sheet 11 and are perforated as at 13b according to a predetermined pattern and placed in contact with the opposite sides of the glass sheet 11. The assembly is immersed in a chemical tempering bath 15a comprising a molten salt or salts providing the ions which are to diffuse into the glass. Ion exchange takes place predominantly at the areas of the sheet exposed to the bath through the perforations.

Figure 2:
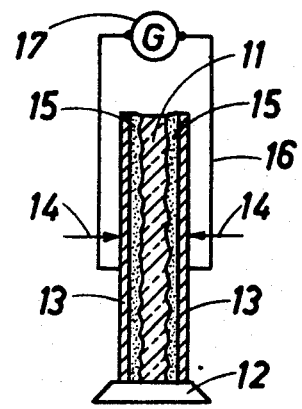
FIG. 2 is a schematic sectional view similar to FIG. 1 for performing a modified process.

FIG. 2 illustrates a process similar to that described with reference to FIG. 1. FIG. 2 shows a sheet of patterned glass 11 being treated. The plates 13 in this case are of uniform thickness. The required predetermined variation in the thicknesses of the layers of medium 15 results from the configuration of the glass surfaces. The tempering treatment is accelerated by applying an alternating electrical potential to the plates 13 by a generator 17 via connections 16. The plates 13 are electrically conductive and the support 12 is electrically insulating and makes good contact with the bottom edge of the glass sheet 11 so as to prevent any short-circuiting between the plates 13, through the medium 15.

Figure 3:
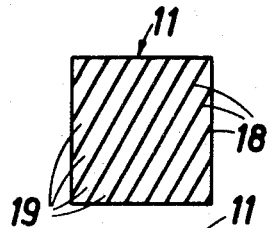
FIGS. 3 to 7 show various differential tempering patterns.

Reference is now made to FIGS. 3 to 7, illustrating differential tempering patterns. In FIG. 3 the lines 18 represent narrow tempering zones where the magnitude of the compressive stresses is greater than in the intervening wider zones 19. On breakage, the glass divides into rather long fragments. The fragmentation is smaller if the reverse side of the glass sheet is tempered according to a similar pattern but with the narrow zones corresponding with lines 18 directed obliquely across the sheet in the other direction.

Figure 4:
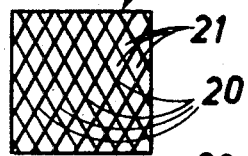

A smaller fragmentation also occurs if the sheet is tempered at each surface according to an oblique type checkerboard pattern as shown in FIG. 4. In this figure, the series of intersecting lines 20 represent narrow zones where the degree of tempering is greater than in the areas 21 which they separate. If on the contrary, the glass is tempered to a lesser extent in the narrow zones 20 than in the areas 21, the fragmentation is either about the same or somewhat less fine and regular, depending on circumstances. A tempering pattern similar to that shown by FIG. 4 but with areas 21 of a variety of different sizes can be adopted but has not been found to give very different results.

Figure 5:
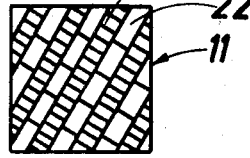
Figure 6:
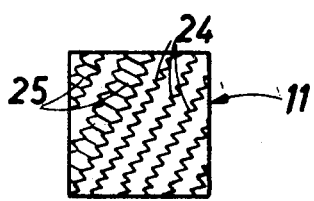
Figure 7:
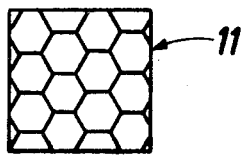

FIG. 5 shows a tempering pattern comprising oblique parallel narrow tempering zones as shown in FIG. 3 and oppositely inclined narrow tempering zones subdividing the bands 19 of FIG. 3 into smaller areas 22, 23 where the glass is tempered to a lesser extent. Rupturing stresses tend to propagate along the outlines of the larger pieces 22 and then along the lines separating the smaller pieces 23. The division of the glass into pieces of a given small size by propagation of the rupturing stresses along predetermined lines tends to be promoted by the presence of numerous corners where tempering lines meet at an angle. For that reason a tempering pattern according to FIG. 6 comprising oblique zigzag lines 24 has advantages over that represented in FIG. 3, and as shown in FIG. 6 at least some of the oblique bands can be subdivided into hexagonal areas 25. FIG. 7 shows a hexagonal pattern wherein the maximum tempering lines outline hexagonal areas but wherein none of the corners is as sharp as the corners at the ends of the hexagons in FIG. 6 and the pieces formed on fragmentation are as a result less liable to cut.

Various manners of achieving differential tempering patterns will now be described with reference to the remaining figures.

Figure 8:
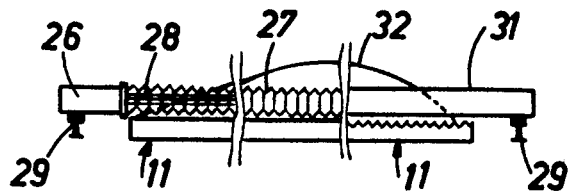
FIGS. 8 to 11 illustrate various manners of applying a medium to a glass sheet according to a predetermined distribution pattern.

In the method represented by FIG. 8, the medium is applied to a glass sheet 11 by means of an applicator in the form of a roller 26 which is supported on rails 29 for travel over the surface of the glass sheet. To illustrate different possibilities by the one figure it is divided into three portions. In the left hand portion the roller is shown as having endless peripheral grooves and intersecting longitudinal grooves 28. In the middle portion of the figure the roller is shown as having only endless peripheral grooves 27. In the right hand portion of the figure the roller is shown as a plain roller and the glass sheet is shown as a patterned glass sheet. A quantity of the medium from which a coating is to be formed is deposited on the glass sheet as a heap 32 and then the roller is moved to and fro to distribute and compress the medium into a layer of the required form determined by the surface shaping of the roller or, in the case where the medium is distributed by a plain roller on a patterned glass surface, by the configuration of the glass surface. A roller having only endless parallel grooves will form a layer with spaced parallel zones having a greater thickness than the intervening zones, whereas a roller which also has axial grooves 28 will form a coating with intersecting series of zones where the layer is of greater thickness than the other areas.

Instead of using a roller to distribute the heap 32 according to the desired pattern upon the sheet 11, it is also possible to distribute the heap 32 as a coating with a constant thickness upon the sheet and to obtain the desired pattern by means of an impressing tool. Such an impressing tool may be constituted, e.g., by a honeycombed screen formed by intersecting plates or juxtaposed tubes which realize the desired pattern.

Instead of impressing the honeycombed screen into the coating, it is also possible to fill differentially the holes of the honeycombed screen with the treating agent and to apply the screen against the sheet during the tempering process.

Figure 9:
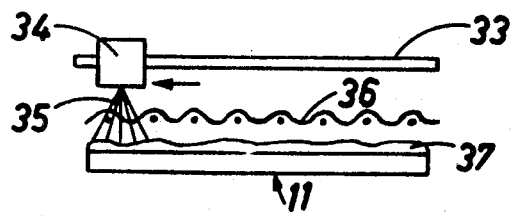

In the method according to FIG. 9, medium is delivered as a conical spray 35 from a spray gun 34 which is displaceable along a guide 33. Between the surface of the glass sheet 11 to be coated and the spray gun there is a stencil or screen 36 of a pattern such that the layer of medium 37 deposited on the glass sheet varies in thickness according to the pattern of the stencil or screen. The medium can be sprayed as a solution or suspension or as a melt of sufficient consistency. It is also possible to apply a medium in powder form by a method similar to that shown by FIG. 9.

Figure 10:
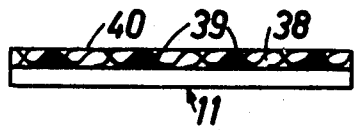

Good results have also been obtained by placing a stencil or screen 38 on the glass sheet 11, as shown in FIG. 10, and then applying medium to the glass sheet through the stencil or screen. The form of the stencil or screen and the consistency of the medium is such that some of the medium seeps under the blank areas 39 of the stencil or screen but the coating formed by the process is of considerably greater depth at the open areas 40 of the stencil or screen. When applying a solid or pasty medium, a quantity thereof can be deposited on the screen and then spread over and forced through the stencil or screen by a scraper device. By way of modification, a thin uniform layer of the medium may be applied to the glass sheet and further medium can be applied on top of that layer, through the stencil or screen. In that case, it is not necessary for medium to seep under the blank areas of the stencil or screen because the corresponding areas of the glass sheet will already have been coated.

Figure 11:
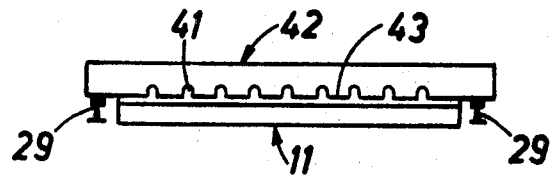

FIG. 11 illustrates a method of forming a layer of medium of variable thickness by means of a scraper 42 with a castellated edge. Scraper 42 is supported on rails 29. The coating layer formed by this method will have parallel ridges corresponding with the indents 41 of the scraper and separated by bands of lesser thickness depending on the spacing of the edge portions 43 of the scraper from the sheet surface.

Figure 12:
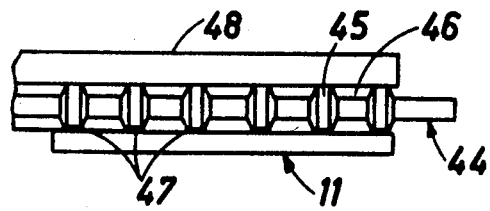
FIG. 12 shows a method of precoating a sheet patternwise with a diffusion restricting substance.

It is not necessary to apply a layer of medium of variable thickness or composition, if the surface onto which the medium is applied is first coated according to a predetermined pattern, corresponding to the desired pattern of stress distribution over the surface of the sheet, with a substance which restricts the exchange of ions between the medium and glass, as for example by increasing the diffusion barrier at the zones where such substance is present. A substance for increasing the diffusion barrier can be applied to form a checkerboard pattern by an apparatus as shown in FIG. 12 comprising a roller 44 with spaced collars 45 joined by axial ribs 46. The roller is displaced over the surface of the sheet 11 and takes up liquid substance from a pad 48 so that the peripheral faces of the collars 45 are maintained charged with the liquid and transfer it to the surface of the glass sheet at 47. When a checkerboard pattern is desired instead of longitudinal bonds the sheet is turned by 90° and again subjected to the action of roller 44. The glass sheet can then be covered by a uniform layer of a medium providing the required ions for diffusion into the glass. The rate of ion exchange will be markedly less at those zones of the sheet bearing the diffusion restricting substance.

Figure 13:
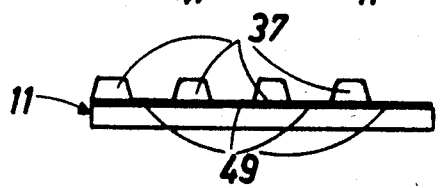
FIG. 13 illustrates another manner of forming a coating with a predetermined nonuniform distribution of the medium.

FIG. 13 shows a glass sheet 11 initially coated with a uniform thin film 49 of a substance providing potassium or other ions for diffusion into the sheet and subsequently coated only at certain zones with further quantities of medium 37. As a result, due to the different extent of the ion exchange process at different places, the sheet 11 is differentially tempered. The zones which were covered by the quantities 37 of the medium are tempered to a greater extent than the other zones of the sheet.

Figure 14:
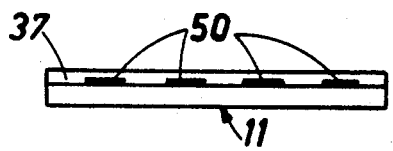
FIG. 14 illustrates a process of treating a sheet of glass which has been precoated according to FIG. 12.

FIG. 14 shows a glass sheet 11 bearing at certain positions only, coatings 50 of a substance which restricts diffusion of potassium ions into the sheet from a medium 37 subsequently applied over the whole of the sheet, and/or which restricts diffusion of sodium ions form the sheet into the medium. The substance forming the coatings 50 may, e.g., be a metal such as copper, or an oxide such as $TiO_2$. In the actual embodiment represented by the figure, the coatings 50 were deposited by evaporation in vacuo, the areas of the sheet 11 not required to be coated by the diffusion restricting substance being masked. Coatings 50 can, however, be formed in various other ways, e.g., by dipping the sheet in a solution of the substance, followed by pyrolysis, the areas of the sheet not required to be coated again being masked. After formation of the coatings 50 a uniform layer 37 of a potassium salt is deposited and ion exchange between this coating and the glass sheet 11 is brought about at a temperature below the annealing point of the glass, e.g., at 450° C. The coatings 50 restrict the ion exchange at the zones where these coatings are present so that at the corresponding zones the glass sheet is tempered to a lesser extent than elsewhere.

The foregoing description of processes according to the invention has been mainly of processes involving an ion exchange. An example of a cementation-type process according to the invention, is as follows: an ordinary soda-lime silicate glass was coated selectively according to a predetermined pattern with a film of gasoline and the surface thus treated was entirely covered by a powder mixture comprising (by weight) 80 percent sand, 10 percent titanium and 10 percent of $TiO_2$, the grain size being in the range 0.1 to 0.5 mm. By means of a mold the powder was formed into a layer 1 mm. thick at the zones where the gasoline film was present and 2 mm. thick at the other regions. The coated glass was heated at 400° C. for 10 minutes. After cooling it was observed that the glass had a metallic grey coloring except at the places which bore the gasoline coating. It was found that $TiO_2$ molecules, and some titanium, had entered the external layers of the glass sheet, and at least part of this titanium was in the atomic state. Compressive stresses had been set up in the external layers of the glass sheet, and when the sheet was stressed to breaking point, the grey colored portions of the sheet broke into numerous small noncutting fragments free of sharp or jagged edges, whereas the other portions of the sheet broke in the manner of ordinary glass.

The following is an example of the application of the invention to the treatment of a vitrocrystalline material. A sheet of glass formed from the following composition: $SiO_2$: 42.3 percent, $Al_2O_3$: 31.2 percent, $Na_2O$: 10.4 percent, $K_2O$: 6.2 percent, CaO: 1.8 percent, $TiO_2$: 7.4 percent, $As_2O_3$: 0.7 percent (the parts being by weight) was subjected to heat treatment, as known per se, to bring about partial crystallization. Following the heat treatment, the sheet contained about 20 percent by weight of a crystalline phase of nepheline and about 80 percent by weight of vitreous phase. On being stressed to breaking point the sheet broke into quite large cutting pieces. In a comparative test, a sheet of the same vitrocrystalline material was coated with a layer of hydrated china clay containing 10 percent by weight of potassium nitrate. The clay layer was dried in air until the layer began to crack, the fissures following a network pattern with "meshes" substantially square in shape and with a size of approximately 1 cm. × 1 cm. The cracks were then filled with a quantity of the same china clay which, however, had been charged with 50 percent by weight of potassium nitrate. The coated sheet was then heated in a furnace at 410° C. for 1 hour and then cooled. When the treated vitrocrystalline sheet was stressed to breaking point, the rupturing stresses propagated along the lines of the network so that the sheet spontaneously divided into fragments of about 1 cm. square in size.

It will be understood that the above description of the present invention is susceptible to various modifications, changes, and adaptations, and the same are intended to be comprehended within the meaning and range of equivalents of the appended claims.

I claim:

1. In a process for chemically tempering a body of glass, vitrocrystalline material, ceramic or rock by contacting the body with contacting medium containing ions for diffusing into said body, the improvement which comprises diffusing the ions differentially into said body at least over one surface thereof over an interface between the surface and the medium and predominantly along intersecting series of lines subdividing the surface into a multiplicity of relatively small areas, different concentrations of the ions being diffused into said body along each of a plurality of the lines.

2. A process as defined in claim 1 wherein the contacting step is performed by coating at least one layer of said medium on said body.

3. A process as defined in claim 2 wherein said coating layer is of substantially uniform thickness and the ions which it contains vary in concentration from one part of said layer to another.

4. A process as defined in claim 3 wherein said contacting step is performed by applying the layer of medium which is of uniform composition and then selectively adding to different areas of said layer a substance which modifies the concentration of ions available for entering the body during diffusion.

5. A process as defined in claim 2 wherein said coating step is performed prior to diffusion by first selectively coating said body with a substance which restricts diffusion of ions from the medium into said body and then applying to the thus-coated body a layer of the medium which varies in thickness from one zone to another.

6. A process as defined in claim 2 wherein said coating step is performed prior to diffusion by first selectively coating said body with a substance which promotes diffusion of ions from the medium into said body and then applying to the thus-coated body a layer of the medium which varies in thickness from one zone to another.

* * * * *